United States Patent Office 3,790,582
Patented Feb. 5, 1974

3,790,582
CERTAIN PYRIDYLPHOSPHATES, THIOPHOSPHATES, PHOSPHONATES AND THIOPHOSPHONATES
Daniel Demozay, Villeurbanne, and Daniel Pillon and Jacques Ducret, Lyon, France, assignors to Pepro, Societe pour le Developpement et la Vente de Specialites Chimiques, Lyon, France
No Drawing. Filed June 28, 1971, Ser. No. 157,636
Claims priority, application France, June 30, 1970, 7024078
Int. Cl. C07d 31/50
U.S. Cl. 260—294.8 K   9 Claims

ABSTRACT OF THE DISCLOSURE

Phosphoric derivatives containing substituted methylpyridines and having the general formula

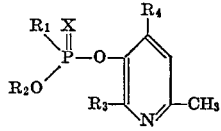

and their use in insecticidal, acaricidal and nematicidal compositions.

---

The present invention relates to new phosphoric esters, in particular substituted methylpyridinic esters of phosphoric, phosphonic, thoiophosphoric, and phosphoramidic acids. In addition, the invention relates to the use of such compounds for fighting against insects, acaridae, and nematodes.

The phosphoric esters according to the invention may be represented by the following general formula

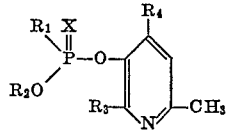

wherein $R_1$ is an alkyl, alkoxy, containing from 1 to 4 carbon atoms, halogenoalkyl, alkylamino, dialkylamino, phenyl, phenoxy radical in which the alkyl group contains 1 to 4 carbon atoms; $R_2$ is an alkyl radical containing from 1 to 4 carbon atoms, which maye be halogenated; $R_3$ and $R_4$ are identical or different, and selected from hydrogen, halogen, nitro, or cyano, but in which both cannot be hydrogen; and X is oxygen or sulfur.

Phosphorus derivatives containing one pyridinic radical in their molecule are already known, and some of them have been reported as having advantageous insecticide properties, namely those described in French Pat. No. 1,063,067 dated Apr. 19, 1962.

We have discovered a series of new compounds wherein the phosphorous-containing radical is attached in the 3 position to the pyridinic ring, while having a methyl radical in the 6 position and may, besides, have substituents in the 2-4 position of said pyridinic nucleus. Said compounds have insecticidal and acaricidal properties much more advantageous than the derivatives described in the above-mentioned patent.

In general, the compounds of this invention are prepared by allowing a chloride of phosphoric, phosphonic, thiophosphoric, or phosphoramidic acid to react with a substituted hydroxy - 3 - methyl - 6 - pyridine, in the presence of a hydracid acceptor, or with one of the salts of the hydroxypyridine. The reaction is preferably carried out in the presence of organic solvents, such as ketones, alcohols, aromatic or aliphatic hydrocarbons. In general, a reaction temperature is selected within the range of 20° C. to 80° C.

The following examples, which are given by way of illustration, but not by way of limitation, show the method for preparing substituted hydroxypyridines (Examples 1–5) on the one hand, and the preparation of the phosphoric esters (Examples 6–12) on the other hand.

EXAMPLE I

Chloro-2-hydroxy-3-methyl-6-pyridine

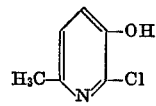

290 g. (1.4 M) of phosphorus pentachloride are added in increments to 154 g. (1 M) of nitro-2-hydroxy-3-methyl-6-pyridine suspended in 500 ml. of phosphorus oxychloride. Gas evolution takes place in abundance. Thereafter, the mixture is refluxed until the evolution gas ceases. The solution becomes clear, and is allowed to stand overnight.

The solution is then decomposed over 5 l. of distilled water, and neutralized with 2550 ml. of strong soda, until a pH 5 or 6 is obtained.

The resulting white precipitate is filtered, washed with water until the Cl⁻ ions are eliminated, and then dried.

Weight obtained _____ g____ 125
Melting point _____ ° C____ 198
Yield _____ percent____ 95

Said precipitate recrystallized in ethanol melts at 199° C.

*Analysis.*—Calculated for $C_6H_6ClNO$ (percent): C, 50.17; H, 4.18; N, 9.75; Cl, 24.74. Found (percent): C, 50.22; H, 4.06; N, 9.64; Cl, 24.64.

EXAMPLE 2

Bromo-2-hydroxy-3-methyl-6-pyridine

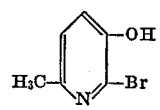

32 g. (0.2 M) of bromine in solution in 200 ml. of pyridine are poured onto 21.8 g. (0.2 M) of hydroxy-3-methyl-6-pyridine in solution in 100 ml. of pyridine. The reaction is allowed to proceed for 5 hours at ambient temperature.

The solution is neutralized with 0.2 M of soda, and the pyridine is removed by steam distillation. Precipitates form in the remaining solution upon cooling. The precipitate is washed and dried. It is black, and its melting point is not well defined. It is dissolved in 150 ml. of ethanol, and treated with bone black. After filtering and cooling the solution, a light beige precipitate is obtained.

Weight _____ g__ 17.7
Melting point _____ ° C__ 193.5
Yield _____ percent__ 47

*Analysis.*—Calculated for $C_6H_6BrNO$ (percent): C, 38.29; H, 3.19; N, 7.44; Br, 42.44. Found (percent): C, 38.25; H, 3.02; N, 7.37; Br, 42.37.

EXAMPLE 3

Iodo-2-hydroxy-3-methyl-6-pyridine

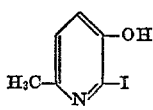

109 g. (1 M) of hydroxy-3-methyl-6-pyridine are suspended in 500 ml. of distilled water containing 150 g. of sodium carbonate, 280 g. (1.1 M) of iodine are dissolved in 2 l. of distilled water by means of 280 g. of potassium iodide, and added to the suspension at ordinary temperature, after which the reaction is allowed to proceed for 2 hours at room temperature.

The resulting precipitate is filtered. It is then dissolved in 2 l. of soda solution containing 25 g./l., and treated at boiling with bone black for 15 minutes. After filtering, the solution is cooled, and then neutralized with 80 ml. of acetic acid.

The light beige precipitate thus obtained is filtered and dried.

Weight _____g__ 180
Melting point _____° C__ 195–198
Yield _____percent__ 77

Recrystallized in ethanol, it melts at 203° C.

Analysis.—Calculated for $C_6H_6INO$ (percent): C, 30.63; H, 2.55; N, 5.95; I, 54.04. Found (percent): C, 30.84; H, 2.46; N, 5.89; I, 54.17.

EXAMPLE 4

Chloro-2-hydroxy-3-nitro-4-methyl-6-pyridine

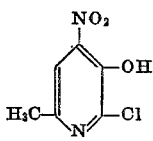

10 ml. of red fuming nitric acid are added slowly to 14.35 g. (0.1 M) of chloro-2-hydroxy-3-methyl-6-pyridine dissolved in 50 ml. of strong sulfuric acid. The reaction mixture is then heated for 15 hours at 50° C. It is then poured onto 200 g. of cracked ice, and neutralized to pH 3 with 215 ml. of ammonia. The resulting yellow precipitate is filtered and dried.

Weight _____g__ 7
Melting point _____° C__ 76
Yield _____percent__ 37

Analysis.—Calculated for $C_6H_5ClN_2O_3$ (percent): C, 38.19; H, 2.65; N, 14.85; Cl, 18.83. Found (percent): C, 38.08; H, 2.66; N, 14.79; Cl, 18.1.

EXAMPLE 5

Dichloro-2-4-hydroxy-3-methyl-6-pyridine

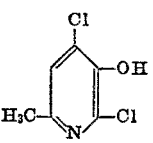

12.5 g. (0.06 M) of phosphorus pentachloride are added in increments to 7.5 g. (0.04 M) of chloro-2-hydroxy-3-nitro-4-methyl-6-pyridine in solution in 50 ml. of phosphorus oxychloride. The solution is refluxed until the gas evolution ceases (30 minutes), and then allowed to stand overnight. It is then decomposed over 200 ml. of water, and neutralized with 210 ml. of strong soda. As the resulting precipitate is brown and has a very low melting point, it is recrystallized in 0 ml. of distilled water. Its melting point is then 138° C., but the yield of the reaction is very low: 11.2%. Weight obtained: 0.8 g.

Analysis.—Calculated for $C_6H_5Cl_2NO$ (percent): C, 40.44; H, 2.80; N, 7.86; Cl, 39.88. Found (percent): C, 40.45; H, 2.84; N, 7.92; Cl, 39.89.

EXAMPLE 6

O-O-dimethyl and O-3(iodo-2-methyl-6)pyridyl phosphate

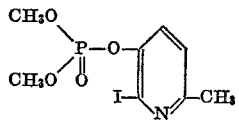

The sodium ethoxide prepared from 0.7 g. (0.03 M) of sodium and 40 ml. of absolute alcohol is added to 7.05 g. of iodo-2-hydroxy-3-methyl-6-pyridine (0.03 M) in solution in 40 ml. of absolute alcohol. The reaction is continued for one hour at room temperature. 4.35 g. of dimethylchlorophosphate (0.03 M) are then added at room temperature, and the mixture is refluxed for one hour.

The sodium chloride is filtered off and the alcohol is removed. The residue is taken up with 100 ml. of chloroform, and washed once with 80 ml. of 5% sodium bicarbonate, and twice with 80 ml. of distilled water, and then dried with magnesium sulfate. The chloroform is removed under water pump vacuum, and then under high vacuum during one hour. The oil thus obtained is of light brown color.

Weight _____g__ 7.9
$n_D^{20}$ _____ 1.5525
Yield _____percent__ 76.5

Analysis.—Calculated for $C_8H_{11}INO_4P$ (percent): C, 27.98; H, 3.20; N, 4.08; P, 9.03. Found (percent): C, 27.80; H, 3.30; N, 3.91; P, 8.89.

EXAMPLE 7

O-methyl and O-3(nitro-2-methyl-6)pyridyl methylphosphate

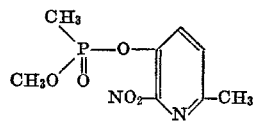

The sodium ethoxide prepared from 1.15 g. (0.05 M) of sodium and 40 ml. of absolute alcohol is added to 7.7 g. of nitro-2-hydroxy-3-methyl-6-pyridine (0.05 M) in solution in 40 ml. of absolute alcohol. The reaction is continued for one hour at room temperature. 6.4 g. (0.05 M) of O-methyl-methylchlorophosphinate are then added at ordinary temperature, after which the mixture is refluxed for one hour.

The sodium chloride is then filtered off, and the alcohol removed. The residue is taken up with 100 ml. of chloroform, and washed once with 80 ml. of 5% sodium bicarbonate and twice with 80 ml. of distilled water, and then dried over magnesium sulfate. The chloroform is then removed, and a raw light yellow oil is obtained.

Weight _____g__ 8.8
$n_D^{20}$ _____ 1.5145
Yield _____percent__ 71.5

Analysis.—Calculated for $C_8H_{11}N_2O_5P$ (percent): C, 39.02; H, 4.47; N, 11.38; P, 12.60. Found (percent): C, 39.22; H, 4.49; N, 11.23; P, 12.57.

EXAMPLE 8

O-O-diethyl and O-3(chloro-2-methyl-6)pyridyl thiophosphate

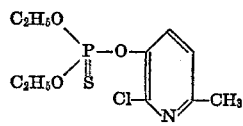

The sodium ethoxide, prepared from 0.9 g. (0.04 M) of sodium and 40 ml. of absolute alcohol, is added to 5.75 g. of chloro-2-hydroxy-3-methyl-6-pyridine (0.04

M) in solution in 40 ml. of absolute alcohol. The reaction is maintained for one hour at room temperature. 7.55 g. of diethylchlorothiophosphate (0.04 M) are then added at room temperature, and the mixture is then refluxed for one hour.

The sodium chloride is filtered off and the alcohol removed. The residue is taken up with 100 ml. of chloroform and washed with 80 ml. of 5% sodium bicarbonate, and then twice with 80 ml. of distilled water. It is then dried over magnesium sulfate. The chloroform is then removed and the oil is distilled under high vacuum. The resulting oil (yield, 63.5%; weight, 7.5 g.) has a very pale yellow color and the following physical constants:

Boiling point, 0.006 mm. Hg _____ °C__ 112
$n_D^{20}$ ----------------------------------------- 1.5235

Analysis.—Calculated for $C_{10}H_{15}ClNO_3PS$ (percent): C, 40.61; H, 5.07; N, 4.73; P, 10.49. Found (percent): C, 40.86; H, 4.84; N, 4.78; P, 10.45.

EXAMPLE 9

O-ethyl and O-3(chloro-2-methyl-6)pyridyl dimethylamidophosphate

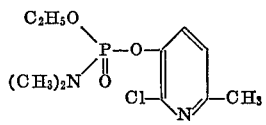

The sodium ethoxide prepared from 0.9 g. (0.04 M) of sodium and 40 ml. of absolute alcohol is added to 5.75 g. (0.04 M) of chloro-2-hydroxy-3-methyl-6-pyridine in solution in 40 ml. of absolute alcohol. The reaction is carried on for one hour at room temperature. 6.85 g. of ethyl-dimethylamido-chlorophosphate (0.04 M) are then added at room temperature, and the reaction mixture is then refluxed for one hour.

The sodium chloride is filtered, and the alcohol removed. The residue is taken up with 100 ml. of chloroform, and then washed once with 80 ml. of 5% sodium bicarbonate and once with 80 ml. of distilled water. It is then dried over magnesium sulfate. The chloroform is then removed, and the oil is distilled under high vacuum. The resulting oil is colorless.

Weight _____ g__ 7.5
Yield _____ percent__ 67
Boiling point, 0.04 mm. Hg _____ °C__ 112
$n_D^{20}$ ----------------------------------------- 1.5040

Analysis.—Calculated for $C_{10}H_{16}ClN_2O_3P$ (percent): C, 43.08; H, 5.74; N, 10.05; P, 11.13. Found (percent): C, 43.12; H, 6.04; N, 9.91; P, 11.12.

EXAMPLE 10

O-ethyl- and O-3(chloro-2-methyl-6)pyridyl phenylthiophosphonate

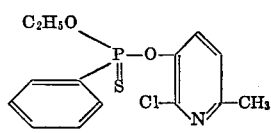

The sodium ethoxide prepared from 0.8 g. (0.035 M) of sodium and 40 ml. of absolute alcohol is added to 5 g. (0.035 M) of chloro-2-hydroxy-3-methyl-6-pyridine in solution in 40 ml. of absolute alcohol. The reaction is maintained for one hour at ordinary room temperature. 7.7 g. (0.035 M) of ethyl-phenylchlorothiophosphonate are then added at ordinary temperature, and the reaction mixture is refluxed for one hour.

The sodium chloride is filtered, and the alcohol removed. The residue is taken up with 100 ml. of chloroform, and washed once with 80 ml. of 5% sodium bicarbonate solution, and then with 80 ml. of distilled water. It is then dried over magnesium sulfate.

The chloroform is then removed, and the resulting light yellow oil (yield: 85.5%) is kept raw.

Weight _____ g__ 9.8
$n_D^{20}$ ----------------------------------------- 1.5855

Analysis.—Calculated for $C_{14}H_{15}ClNO_2PS$ (percent): C, 51.30; H, 4.58; N, 4.27; P, 9.46. Found (percent): C, 51.33; H, 4.63; N, 4.18; P, 9.48.

EXAMPLE 11

O-O-diethyl and O-3(bromo-2-methyl-6)pyridyl phosphate

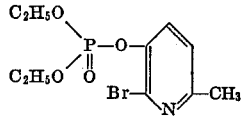

The sodium ethoxide prepared from 0.8 g. (0.035 M) of sodium and 40 ml. of absolute alcohol is added to 6.6 g. (0.035 M) of bromo - 2-hydroxy-3-methyl-6-pyridine in soltuion in 40 ml. of absolute alcohol. The reaction is carried on for one hour at room temperature. 6.05 g. of diethylchlorophosphate (0.035 M) are then added at ordinary temperature, and the mixture is refluxed for one hour.

The sodium chloride is filtered, and the alcohol removed. The residue is taken up with 100 ml. of chloroform, and then washed with 80 ml. of 5% sodium bicarbonate, after which it is washed again with 80 ml. of distilled water and dried over magnesium sulfate. The chloroform is removed, and the resulting oil is kept raw.

Weight _____ g__ 7.2
$n_D^{20}$ ----------------------------------------- 1.5115
Yield _____ percent__ 63.5

Analysis.—Calculated for $C_{10}H_{15}BrNO_4P$ (percent): C, 37.03; H, 4.63; N, 4.32; P, 9.56. Found (percent): C, 36.95; H, 4.96; N, 4.30; P, 9.48.

EXAMPLE 12

O-O-diethyl and O-3(chloro-2-nitro-4-methyl-6)pyridyl phosphate

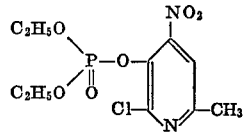

The sodium ethoxide prepared from 0.8 g. (0.035 M) of sodium and 40 ml. of absolute alcohol is added to 6.6 g. (0.035 M) of chloro - 2-hydroxy-3-nitro-4-methyl-6-pyridine in solution in 40 ml. of absolute alcohol. The reaction is carried on for one hour at ordinary temperature. 6.05 g. (0.035 M) of diethylchlorophosphate are then added at room temperature, and the mixture is then refluxed for one hour.

The sodium chloride is filtered, and the alcohol removed, as by distillation. The residue is then taken up with 100 ml. of chloroform, and washed with 80 ml. of 5% sodium bicarbonate, after which it is washed again with 80 ml. of distilled water and dried over magnesium sulfate.

The chloroform is then removed, and the resulting oil is kept raw. It is orange yellow, and its index is:

$n_D^{20}$ ----------------------------------------- 1.4915
Weight _____ g__ 7.9
Yield _____ percent__ 69.5

Analysis.—Calculated for $C_{10}H_{14}ClN_2O_6P$ (percent): C, 36.97; H, 4.31; N, 8.62; P, 9.55. Found (percent): C, 36.71; H, 4.90; N, 8.62; P, 9.38.

The following compound were prepared by a similar method, and their structures and physico-chemical characteristics are given in the table below. The ebullition point is given for all the distillable products.

Compounds corresponding to the formula:

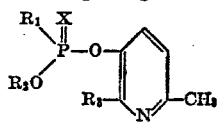

| Product No. | X | R₁ | R₂ | R₃ | R₄ | $n_D^{20}$ index | Boiling temp., °C. mm. Hg | Calculated C | H | N | P | Found C | H | N | P |
|---|---|---|---|---|---|---|---|---|---|---|---|---|---|---|---|
| 1 | O | nC₄H₉O | nC₄H₉ | NO₂ | H | 1.4750 | | 48.55 | 6.64 | 8.03 | 8.95 | 48.59 | 7.02 | 7.98 | 8.76 |
| 2 | O | (CH₃)₂N | C₂H₅ | NO₂ | H | 1.4970 | | 41.52 | 5.53 | 14.53 | 10.72 | 41.35 | 5.37 | 14.40 | 10.62 |
| 3 | O | C₂H₅O | C₂H₅ | NO₂ | H | 1.4905 | | 41.37 | 5.17 | 9.65 | 10.69 | 41.30 | 5.48 | 9.81 | 10.65 |
| 4 | O | isoC₃H₇O | isoC₃H₇ | NO₂ | H | 1.4780 | | 45.28 | 5.97 | 8.80 | 9.71 | 45.34 | 6.40 | 8.63 | 9.71 |
| 5 | S | C₂H₅O | C₂H₅ | NO₂ | H | 1.5208 | | 39.21 | 4.90 | 9.15 | 10.13 | 39.05 | 5.38 | 9.07 | 10.04 |
| 6 | S | isoC₃H₇O | isoC₃H₇ | NO₂ | H | 1.4970 | | 43.11 | 5.68 | 8.38 | 9.28 | 42.76 | 6.28 | 8.13 | 9.03 |
| 7 | O | nC₃H₇O | nC₃H₇ | NO₂ | H | 1.4760 | | 45.28 | 5.97 | 8.80 | 9.74 | 45.26 | 6.36 | 8.70 | 9.77 |
| 8 | O | CH₃O | CH₃ | NO₂ | H | 1.4990 | | 36.64 | 4.19 | 10.68 | 11.83 | 36.53 | 4.21 | 10.64 | 11.81 |
| 9 | S | CH₃O | CH₃ | NO₂ | H | 1.5331 | | 34.53 | 3.95 | 10.07 | 11.15 | 34.61 | 4.09 | 10.22 | 11.05 |
| 10 | O | C₂H₅ | C₂H₅ | NO₂ | H | 1.5010 | | 43.79 | 5.47 | 10.21 | 11.31 | 43.71 | 5.38 | 10.27 | 11.24 |
| 11 | S | ⌬ | CH₃ | NO₂ | H | 1.5820 | | 48.17 | 4.01 | 8.64 | 9.56 | 48.14 | 4.27 | 8.67 | 9.37 |
| 12 | S | Same | C₂H₅ | NO₂ | H | 1.5770 | | 49.70 | 4.43 | 8.28 | 9.17 | 49.74 | 4.31 | 8.14 | 9.05 |
| 13 | O | CH₃ | CH₃O | NO₂ | H | 1.5145 | | 39.02 | 4.47 | 11.38 | 12.60 | 39.22 | 4.49 | 11.29 | 12.57 |
| 14 | O | C₂H₅O | C₂H₅ | Cl | H | 1.4940 | 105/0.008 | 42.93 | 5.36 | 5.00 | 11.09 | 43.15 | 5.13 | 5.00 | 11.09 |
| 15 | S | C₂H₅O | C₂H₅ | Cl | H | 9.5235 | 112/0.006 | 40.61 | 5.07 | 4.73 | 10.49 | 40.65 | 4.84 | 4.75 | 10.45 |
| 16 | O | CH₃O | CH₃ | Cl | H | 1.5035 | | 38.17 | 4.37 | 5.56 | 12.32 | 38.02 | 4.31 | 5.68 | 12.19 |
| 17 | O | isoC₃H₇O | isoC₃H₇ | Cl | H | 1.4840 | 108/0.005 | 46.82 | 6.17 | 4.55 | 10.08 | 47.14 | 5.96 | 4.55 | 10.09 |
| 18 | S | isoC₃H₇O | isoC₃H₇ | Cl | H | 1.5105 | 108/0.005 | 44.51 | 5.87 | 4.32 | 9.58 | 44.50 | 6.18 | 4.35 | 9.54 |
| 19 | O | nC₃H₇O | nC₃H₇ | Cl | H | 1.4870 | 127/0.013 | 46.82 | 6.17 | 4.55 | 10.08 | 47.00 | 6.28 | 4.65 | 9.97 |
| 20 | O | nC₄H₉O | nC₄H₉ | Cl | H | 1.4845 | 127/0.005 | 50.07 | 6.85 | 4.17 | 9.24 | 50.12 | 6.90 | 4.17 | 9.25 |
| 21 | O | C₂H₅ | C₂H₅ | Cl | H | 1.5080 | 104/0.008 | 45.54 | 5.69 | 5.31 | 11.76 | 46.00 | 6.09 | 5.35 | 11.91 |
| 22 | O | CH₃ | CH₃ | Cl | H | 1.5210 | 105/0.01 | 40.76 | 4.67 | 5.94 | 13.16 | 40.81 | 4.72 | 6.03 | 13.08 |
| 23 | S | CH₃O | CH₃ | Cl | H | 1.5360 | | 35.88 | 4.11 | 5.23 | 11.58 | 35.98 | 4.19 | 5.21 | 11.58 |
| 24 | O | (CH₃)₂N | C₂H₅ | Cl | H | 1.5040 | 112/0.04 | 43.08 | 5.74 | 10.05 | 11.13 | 43.12 | 6.04 | 9.91 | 11.12 |
| 25 | S | ⌬ | CH₃ | Cl | H | 1.5940 | | 49.76 | 4.14 | 4.46 | 9.88 | 49.90 | 4.18 | 4.45 | 9.82 |
| 26 | S | Same | C₂H₅ | Cl | H | 1.5855 | | 51.30 | 4.58 | 4.27 | 9.46 | 51.33 | 4.63 | 4.18 | 9.47 |
| 27 | O | C₂H₅O | C₂H₅ | I | H | 1.5408 | 145/0.03 | 32.34 | 4.04 | 3.77 | 8.35 | 32.54 | 4.23 | 3.88 | 8.37 |
| 28 | S | C₂H₅O | C₂H₅ | I | H | 1.5580 | | 31.00 | 3.87 | 3.61 | 8.01 | 31.01 | 4.31 | 3.49 | 8.12 |
| 29 | O | nC₃H₇O | nC₃H₇ | I | H | 1.5240 | | 36.07 | 4.76 | 3.50 | 7.76 | 36.43 | 4.81 | 3.44 | 7.16 |
| 30 | O | isoC₃H₇O | isoC₃H₇ | I | H | 1.5215 | | 36.07 | 4.76 | 3.50 | 7.76 | 36.49 | 4.90 | 3.40 | 7.42 |
| 31 | S | isoC₃H₇O | isoC₃H₇ | I | H | 1.5425 | | 34.69 | 4.58 | 3.36 | 7.46 | 34.54 | 4.70 | 3.39 | 7.60 |
| 32 | O | nC₄H₉O | nC₄H₉ | I | H | 1.5150 | | 39.34 | 5.38 | 3.27 | 7.26 | 39.46 | 5.36 | 3.22 | 6.93 |
| 33 | O | ClCH₂CH₂O | ClCH₂CH₂ | I | H | 1.550 | | 27.27 | 2.95 | 3.18 | 7.04 | 26.98 | 3.29 | 3.07 | 7.18 |
| 34 | O | (CH₃)₂N | C₂H₅ | I | H | 1.5455 | | 32.43 | 4.32 | 7.56 | 8.37 | 32.31 | 4.50 | 7.57 | 8.48 |
| 35 | O | C₂H₅ | C₂H₅ | I | H | 1.5525 | | 33.80 | 4.22 | 3.94 | 8.73 | 34.04 | 4.02 | 4.16 | 8.98 |
| 36 | O | CH₃ | CH₃ | I | H | 1.5605 | | 29.35 | 3.36 | 4.25 | 9.48 | 29.47 | 3.21 | 4.15 | 9.68 |
| 37 | O | CH₃O | CH₃ | I | H | 1.5525 | | 27.98 | 3.20 | 4.08 | 9.03 | 27.80 | 3.30 | 3.91 | 8.89 |
| 38 | S | CH₃O | CH₃ | I | H | 1.5910 | | 26.74 | 3.06 | 3.89 | 8.63 | 26.78 | 3.03 | 4.09 | 8.66 |
| 39 | S | ⌬ | CH₃ | I | H | 1.6355 | | 38.51 | 3.21 | 3.45 | 7.67 | 38.67 | 3.27 | 3.86 | 7.60 |
| 40 | S | ⌬ | C₂H₅ | I | H | 1.6275 | | 40.09 | 3.57 | 3.34 | 7.39 | 40.37 | 3.53 | 3.26 | 6.88 |
| 41 | O | C₂H₅O | C₂H₅ | Cl | NO₂ | 1.4915 | | 36.97 | 4.31 | 8.62 | 9.55 | 36.71 | 4.90 | 8.62 | 9.38 |
| 42 | O | C₂H₅O | C₂H₅ | CN | H | 1.482 | | 48.89 | 5.55 | 10.37 | 11.48 | 49.93 | 5.60 | 10.30 | 11.48 |

The insecticidal properties of said compounds have been established by means of numerous tests carried out both in the laboratory and in greenhouses. The following examples, which are not restrictive, describe the experimentation conditions and the results obtained, with the compounds of this invention as compared with known compounds having similar structures such as:

Compound A

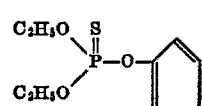

Compound B

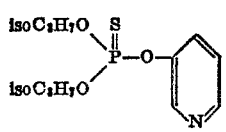

Compound C

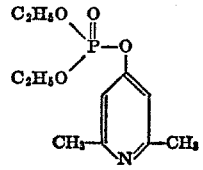

Compound D

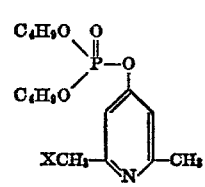

EXAMPLE 13

Test on *Musca domestica*

Ten adult flies, 4–5 days old, are disposed in a Petri box provided with a netting lid. The box is treated difectly by spraying thereon 5 cc. of a solution in acetone of the active material to be tested.

The numbers of flies dead and alive are counted one hour after the treatment. Under such conditions, products Nos. 8, 9, 14, 15, 16, 21, 22, 23 and 42 give 100% mortality for the flies with a concentration of 0.05 g./l., and products Nos. 3, 10, 13, 27, and 37 give 100% mortality at a concentration of 0.1 g./l. By way of comparison, known Compounds A and B require a concentration of 0.5 g./l. to obtain a similar result. Under the same conditions, DDT requires a concentration of 1 g./l. to obtain a similar result.

EXAMPLE 14

Test on *Ephestia kuhnielle*

A few drops (3) of an acetone solution of the active material to be tested are deposited onto an azyme cachet. The acetone is then allowed to evaporate, and 10 eggs of *Ephestia kuhnielle* are disposed on said cachet, and covered with a glass plate to prevent any escape. A mortality check is effected 10 days later.

Under such conditions, products Nos. 9 and 40 give 100% mortality at a concentration of 0.0005 g./l. Products Nos. 3, 11, 12, 21 and 26 give 100% mortality at a concentration of 0.001 g./l. By way of comparison, known Compounds A and C require a concentration of 0.01 g./l. for obtaining an 80% mortality, and Compounds B and C require a concentration of 0.1 g./l. for obtaining 100% mortality Among the insecticide compounds widely used heretofore, DDT and α-naphthyl N-methylcarbamate (carbaryl) require a concentration of 0.1 g./l. in order to obtain a similar result.

EXAMPLE 15

Test on *Tetranychus urticae*

Bean plants infested with *Tetranychus urticae* are treated directly by means of a compressed air sprayer filled with a solution of the active material to be tested. The mortality check is made by comparison with a reference series of untreated bean plants.

Under such conditions, at a concentration of 50 g./hl., Compounds Nos. 3, 5, 8, 9, 10, 11, 12, 13, 14, 15, 16, 19, 22, 23, 24, 25, 26, 36, 37 and 40 bring about a 100% mortality of the Acaridae.

EXAMPLE 16

Test on *Blatella germanica*

Five adult cockroaches are disposed in a Petri box provided with a netting lid. The box is treated directly by means of a spraying tower which sprays 5 cc. of an acetone solution of the active material being tested, at various concentrations. The resulting mortality obtained after treatment is then noted.

Under such conditions, Compounds Nos. 3, 5, 8, 10, 15, 21, 22 and 42 give 100% mortality among the cockroaches at a concentration of 0.1 g./l. Under the same conditions, known Compounds A and B require a concentration of 1 g./l. to obtain the same result. Under the same conditions, well-known insecticides, such as azinphosethyl [O,O diethyl S-(4, oxo 1, 2, 3 benzotriazin-3 [4 H]yl methyl)phosphorodithicate], malathion [S - 1, 2 - di(ethoxycarbonyl)ethyl dimethylphosphorothiolothionate], or ronnel [O,O dimethyl O-(2,3,4-trichlorophenyl) phosphorothioate] should be used at concentrations of the order of one gram/liter to bring about a complete destruction of cockroaches.

EXAMPLE 17

Test on *Coenorhabditis elegans*

10 cc. of a solution of the compound to be tested are poured into a 250 cc. screw-cap powder-box. 3-4 drops of a concentrated suspension of nematodes (*Coenorhabditis elegans*) 4 days old, are then added. After 48 hours, a check for the mortality rate is effected by means of a binocular magnifying glass.

Under such conditions, products Nos. 1, 3, 5, 7, 8, 9, 10, 11, 12, 13, 14, 15, 16, 19, 20, 21, 22, 23, 25 and 37 give 100% mortality of the nematodes at a concentration of 0.1 g./l.

Under the same conditions, but at a concentration ten times less (0.01 g./l.), products Nos. 3, 7, 8, 10, 14, 15, 16, 19, 21, 22 and 42 give 100% mortality of the nematodes.

For all practical purposes, the compounds of this invention should seldom be used in the pure state, except for very low volume applications (U.L.V. treatments). Most often, these active materials are mixed with various adjuvants and carriers, or liquid and/or solid diluents, so as to obtain formulations suitable for the utilization requirements and the character of the problem to be solved. Such formulations may be employed in the form of granules, powdering powders, wettable powders or solutions adapted to be emulsified. The preparation of such formulations pertains to well-known techniques, which are, in particular, described in published works such as "Chemistry of the Pesticides," by D. E. H. Frear, 3rd ed., pp. 409–433.

The polyvalent action of the compounds of this invention enables them to be used in fighting against the parasites of various crops in the agicultural, arboricultural and viticultural fields, as well as in the household or public health fields.

It will be understood that changes may be made in the details of formulations and operation without departing from the spirit of the invention, especially as defined in the following claims.

We claim:

1. A compound having the formula

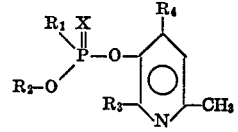

wherein $R_1$ is selected from the group consisting of $C_1$ to $C_4$ alkyl, $C_1$ to $C_4$ haloalkyl, $C_1$ to $C_4$ alkoxy, phenyl and phenoxy; $R_2$ is $C_1$ to $C_4$ alkyl or $C_1$ to $C_4$ haloalkyl; $R_3$ is halogen, $R_4$ is hydrogen and X is S or O.

2. A compound as defined in claim 1 wherein $R_1$ is $C_1$ to $C_4$ alkyl and $R_2$ is $C_1$ to $C_4$ alkyl.

3. A compound having the formula

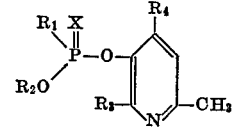

wherein $R_1$ is selected from the group consisting of $C_1$ to $C_4$ alkyl, $C_1$ to $C_4$ haloalkyl, $C_1$ to $C_4$ alkoxy, phenyl and phenoxy; $R_2$ is $C_1$ to $C_4$ alkyl or $C_1$ to $C_4$ haloalkyl; $R_3$ and $R_4$ are each selected from the group consisting of halogen and hydrogen, provided that $R_3$ and $R_4$ are not simultaneously hydrogen; and X is S or O.

4. A compound as defined in claim 3 wherein the compound has the formula

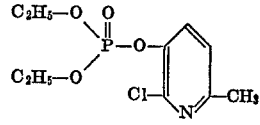

5. A compound as defined in claim 3 wherein the compound has the formula

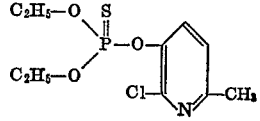

6. A compound as defined in claim 3 wherein the compound has the formula

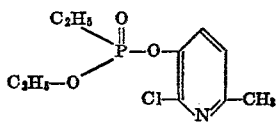

7. A compound as defined in claim 3 wherein the compound has the formula

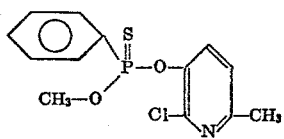

8. A compound as defined in claim 3 wherein the compound has the formula

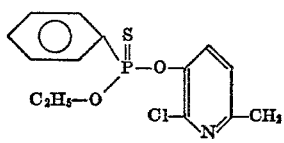

9. A compound as defined in claim 3 wherein the compound has the formula

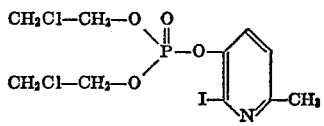

References Cited
UNITED STATES PATENTS

| | | | |
|---|---|---|---|
| 3,478,037 | 11/1969 | Fest et al. | 260—294.8 K |
| 3,669,975 | 6/1972 | Demosay et al. | 260—294.8 K |
| 3,535,325 | 10/1970 | Gubler et al. | 260—294.9 K |

ALAN L. ROTMAN, Primary Examiner

U.S. Cl. X.R.

71—94; 260—296 R, 297 P; 424—263